United States Patent
Da Torre et al.

(10) Patent No.: US 6,983,127 B1
(45) Date of Patent: Jan. 3, 2006

(54) STATISTICAL CALIBRATION OF WIRELESS BASE STATIONS

(75) Inventors: Serge Barbosa Da Torre, San Raphael (FR); David M. Parish, Amherst, NY (US); Athos Kasapi, San Francisco, CA (US); Erik D. Lindskog, Sunnyvale, CA (US); Mitchell D. Trott, Mountain View, CA (US); Adam B. Kerr, Menlo Park, CA (US)

(73) Assignee: ArrayComm, Inc., San Jose, CA (US)

( * ) Notice: Subject to any disclaimer, the term of this patent is extended or adjusted under 35 U.S.C. 154(b) by 505 days.

(21) Appl. No.: 10/209,500

(22) Filed: Jul. 31, 2002

Related U.S. Application Data

(60) Provisional application No. 60/309,448, filed on Jul. 31, 2001.

(51) Int. Cl.
*H04B 17/00* (2006.01)
(52) U.S. Cl. .................... 455/67.11; 455/25; 455/562.1
(58) Field of Classification Search ............ 455/67.11, 455/67.14, 63.4, 561, 562.1, 73, 19, 25; 342/368, 342/378, 373, 374
See application file for complete search history.

(56) References Cited

U.S. PATENT DOCUMENTS

| | | | | | |
|---|---|---|---|---|---|
| 5,262,789 | A | * | 11/1993 | Silverstein | ................... 342/368 |
| 5,557,640 | A | * | 9/1996 | Chadwick | ................... 375/229 |
| 6,037,898 | A | * | 3/2000 | Parish et al. | ................. 342/174 |
| 6,288,675 | B1 | * | 9/2001 | Maloney | ..................... 342/457 |
| 6,304,750 | B1 | * | 10/2001 | Rashid-Farrokhi et al. | . 455/137 |
| 6,654,590 | B2 | * | 11/2003 | Boros et al. | ............. 455/67.14 |
| 6,788,948 | B2 | * | 9/2004 | Lindskog et al. | ........... 455/504 |

* cited by examiner

*Primary Examiner*—Sonny Trinh
(74) *Attorney, Agent, or Firm*—Blakely, Sokoloff, Taylor & Zafman LLP

(57) ABSTRACT

The present invention allows a radio receiver or a transmitter, with a plurality of antennas configured into an array, to be calibrated. In one embodiment, the method includes receiving a plurality of signals from a plurality of remote transmitters at the antenna array, sampling the signals received at at least two antennas of the array, computing a relative phase and amplitude of the sampled signals for each antenna, and computing calibration coefficients based on the relative phase and amplitude for the plurality of sampled signals from the plurality of remote transmitters for each antenna.

21 Claims, 1 Drawing Sheet

STATISTICAL CALIBRATION OF WIRELESS BASE STATIONS

CROSS REFERENCE TO RELATED APPLICATIONS

This application claims the benefit of U.S. Provisional Patent Application Ser. No. 60/309,448 for Statistical Calibration of Wireless Base Stations, to inventors Da Torre, Parish, Kasapi, Lindskog, Trott and Kerr, Assignee Array-Comm, Inc., filed Jul. 31, 2001.

BACKGROUND OF THE INVENTION

1. Field of the Invention

The invention relates generally to the field of digital signal communications and to receive and transmit chain calibration. More particularly, the invention relates to calibrating a wireless base station using statistical operations on an accumulated set of received signals.

2. Description of the Related Art

Radio communications capacity can be greatly increased using directional, rather than omnidirectional radio transmission. One way to transmit directional signals and directionally receive signals is by using beam forming and nulling through an array of antennas. The precision of the beam forming and nulling using an antenna array, can be improved if the transmit and receive chains, from the digital interface at baseband to the field radiated from each antenna element is calibrated. One way of making the calibration is to have a remote, portable RF transponder listen to the output of the antenna array on a base station downlink frequency and re-transmit the downlink signal that it receives from the base station, on the base station's uplink frequency. By selecting appropriate signals to transmit and appropriate signals to receive, the base station can apply signal processing to estimate compensations in phase and amplitude to calibrate its transmit and receive chains.

Calibration signal processing usually includes estimating the phase and amplitude response of the receive section of each antenna from the received electric field at the antenna, to the input to the A/D (analog to digital) converter of the baseband circuitry. The phase/amplitude pair for each antenna receive section forms a complex number, and the collection of these for all the antennas forms a complex valued receive-section calibration vector. Similarly, the phase and amplitude response of the transmit section of each antenna (from the output of the baseband transmit circuitry to the transmitted electric field at the antenna) can be grouped into a complex-valued transmit-section calibration vector.

These calibration vectors tend to change slowly over time due to environmental changes such as temperature, and also over frequency bands, but can change so much that unless they are taken into account, signals transmitted from an antenna array will emanate from each antenna with unknown phase, and therefore reduce the effectiveness of directionally transmitting coherent gain toward desired remote user terminals or nulls to interfering remote user terminals. Since the phase and amplitude response of both the receive and transmit sections depends upon installation-specific items such as cables, connectors, antennas, etc., it is usually not possible to accurately calibrate a system in the factory. For maximum accuracy, calibration is performed "on site", at a rate that tracks the changes.

A remote transponder calibration system is shown, for example, in U.S. Pat. No. 5,546,090 to Roy, III et al. That patent describes a narrowband FDD (frequency division duplex) system that uses a remote transponder for calibration. Such a technique requires external equipment including additional radios and either directional couplers or additional antennas mounted somewhere visible to the base station. This adds the cost of the additional equipment as well as the difficulty in locating the calibration antenna.

For TDD (time division duplex) systems, a similar calibration process can be used, i.e. a transponder can be used to echo back calibration signals. However, with some antenna configurations, it is possible to reuse the same base station hardware that is normally used for regular traffic. Such an approach is shown, for example, in U.S. Pat. No. 6,037,898 to Parish et al. However this method may not work with some directional antenna systems, such as sectorized antenna systems. Sectorized antenna systems are commonly constructed, for example, as a linear array.

BRIEF DESCRIPTION OF THE DRAWING

The present invention is illustrated by way of example, and not by way of limitation, in the FIGURE which is a block diagram illustrating an exemplary architecture of a wireless communication system base station appropriate for use with one embodiment of the present invention.

DETAILED DESCRIPTION OF THE INVENTION

Introduction

Figure 1:
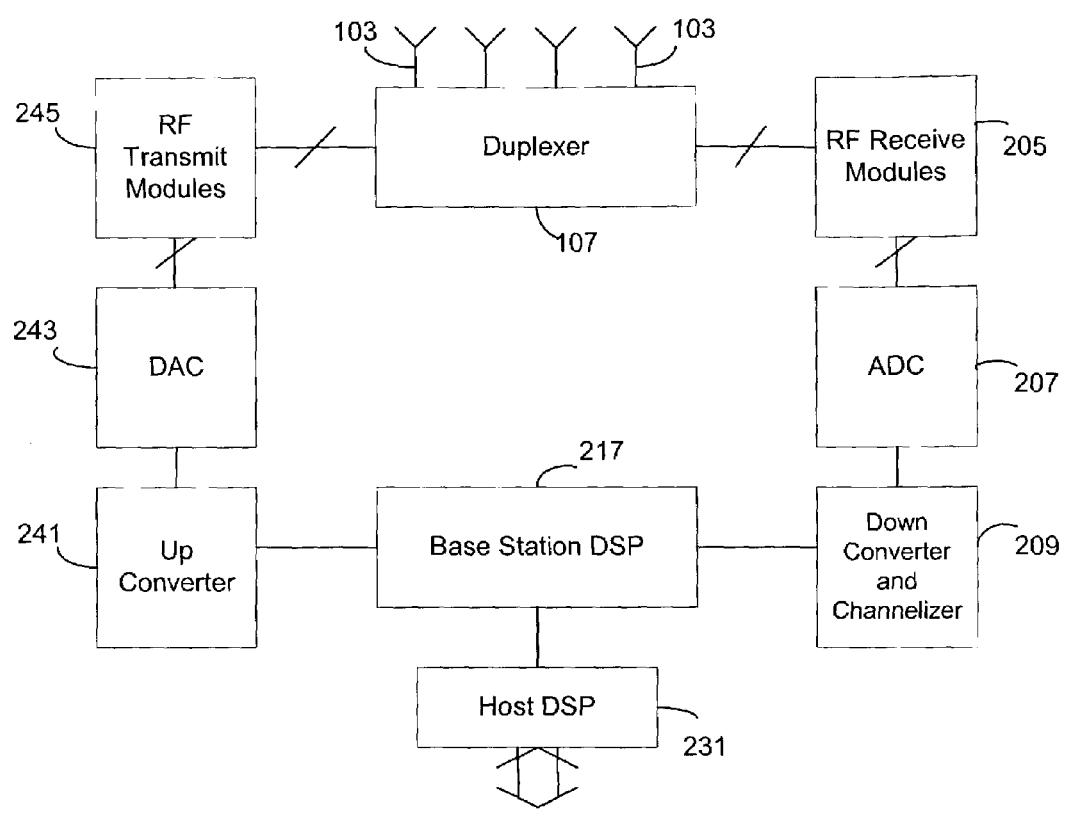

In one embodiment, the present invention is implemented in a Spatial Division Multiple Access (SDMA) radio data communications system as shown and described further with respect to the FIG. 1. In such an SDMA system, each terminal is associated with a set of spatial parameters that relate to the radio communications channel between, for example, the base station and a user terminal. The spatial parameters comprise a spatial signature for each terminal. Using the spatial signature and arrayed antennas, data can be sent to several different user terminals at the same time using the same radio frequency band. Conversely, data can be received from several different user terminals at the same time on the same radio frequency band. In a CDMA system, SDMA can lower the noise floor for subscribers that are spatially separated from one another. The spatial signatures allow the otherwise colliding or interfering signals to be resolved. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial de-multiplexers, multiplexers, and combiners. Extended Kalman filters or other types of linear filters, well-known in the art, can be used to exploit the properties of the training sequences in determining spatial parameters. Further details regarding the use of SDMA systems are described, for example, in U.S. Pat. No. 5,828,658, issued Oct. 27, 1998 to Ottersten et al. and U.S. Pat. No. 5,642,353, issued Jun. 24, 1997 to Roy, III et al.

The present invention provides for the calibration of multiple antenna base stations by exploiting the signals or the feedback provided by actual remote terminal units (or handsets) of the system being calibrated. As a result, no extra equipment, such as directional couplers, radios, calibration antennas, transponders etc., is required to perform calibration. In addition, with no remote calibration antenna and transponder, there is no need to site the remote calibration antenna.

In general, the present invention collects data from regular remote user terminal calls initiated as part of normal operations in order to passively calibrate the receive section for each base station antenna of a multiple antenna array. This feedback from the remote user terminals can include received signal strength measurements or signal quality measurements returned by the terminals to the base station as is done for example in GSM (Global System for Mobile Communications), or more complex measurements, such as transmit diversity data normally returned by the user terminal in the WCDMA (Wideband Code Division Multiple Access) standard. This feedback can be combined with a systematic procedure for varying the relative phases of the signals transmitted from the multiple antennas of the base station in order to calibrate the transmit section for each antenna of the base station. The calibration can be enhanced by determining which of the 'passive' data is valid to use in calibrating the receive and transmit sections. The calibration can be further enhanced by applying statistical methods to extract the most reliable feedback calibration data for the transmit and receive sections.

Depending on the type of smart antenna technique deployed, it may not be necessary to calibrate the receive and transmit chains independently. Instead, they can be calibrated relative to each other. This may be particularly true for TDD systems. For FDD systems, it may be better to use independent calibration for receive and transmit chains since the calibration of some of the hardware, such as the antennas, can change as a function of frequency.

Receive Calibration

The receive calibration finds the relative amplitudes and phases of the feeder cables and radio receivers, from each antenna to baseband, associated with a multiple antenna radio base station.

Receive Method 1: Long Term Statistics Method

Receive method 1 relies on an assumption that over a very long period of time, and over a very large number of remote user terminals (presumed to be in different locations), the average received amplitude and phase of the signals on all the antennas should be the same.

Detailed Methodology for Receive Method 1:
1. Accumulate snapshots of the received signal amplitudes and phases (receive spatial signatures) over a long period of time (days or weeks).
2. Keep only signatures from "qualified" remote user terminal terminals (line of sight or near line of sight), as determined by those signals possessing only 1 significant rake tap (second rake tap more than 10 dB less power). This also should be those remote user terminals with very low multipath.
3. Compute the mean signal amplitude on each of the antennas. These mean signal amplitudes (or alternatively 1/amplitude) are the receive calibration amplitudes.
4. Compute the mean signal phase on each of the antennas. These mean signal phases (or alternatively their conjugates) are the receive calibration phases.

Receive Method 2: Covariance Method

Receive method 2 is an improvement to receive method 1. In method 2, data does not need to be collected for as long a period of time. It is more accurate since it does not rely on the assumption that calibration is stable over periods of days or weeks, and it does not rely on the assumption that the remote user terminal terminals used for calibration are uniformly spatially distributed.

Background:

Receive method 2 relies on an assumption that when the received signals from a particular remote user terminal are "line of sight" or "near line of sight", the received signals arriving at the antenna array should have equal amplitude over all antennas (ignoring fast fading) and should have phases that advance linearly as a function of antenna distance from the source. For example, if the antenna array is a uniform linear array with an antenna spacing of $0.5\lambda$, the received signal phase (relative to the first antenna) should simply be $M \frac{1}{2} \cos\theta$ where $\theta$ is the "angle of arrival" of the received signal and $\theta=0$ is defined as a signal source exactly perpendicular to the array. In general, for a uniform linear array, the change in angle of the arriving signal should be proportional to the antenna index.

If the actual signal arriving at antenna 1 is called S1, then the signal arriving at antenna 2 (ideally) is $S1e^{j\phi}$.

The signal arriving at antenna 3 is $S1e^{j2\phi}$

As discussed above, the received signal seen by the digital portion of the receive chain is the above actual signals operated on by the calibration vectors for relative phase and amplitude of the feeders and receivers. So the signals seen by the receivers will be:

$$R1 = C1*S1$$

$$R2 = C2*S2$$

...

A covariance matrix can be formed as is well known in the art which will form:

| Rzz = | | | |
|---|---|---|---|
| R1 * R1' | R1 * R2' | R1 * R3' | ... R1 * Rn' |
| R2 * R1' | R2 * R2' | R2 * R3' | ... R2 * Rn' |
| R3 * R1' | R3 * R2' | R3 * R3' | ... R3 * Rn' |
| ... Rn * R1' | ... Rn * R2' | ...Rn * R3' | ... Rn * Rn' |

Substituting for the R's provides:

| Rzz = | | | |
|---|---|---|---|
| C1 * S1 * C1' * S1' | C1 * S1 * C2' * S2' | C1 * S1 * C3' * S3' | ... C1 * S1 * Cn' * Sn' |
| C2 * S2 * C1' * S1' | C2 * S2 * C2' * S2' | C2 * S2 * C3' * S3' | ... C2 * S2 * Cn' * Sn' |
| C3 * S3 * C1' * S1' | C3 * S3 * C2' * S2' | C3 * S3 * C3' * S3' | ... C3 * S3 * Cn' * Sn' |
| ... Cn * Sn * C1' * S1' | Cn * Sn * C2' * S2' | Cn * Sn * C3' * S3' | ... Cn * Sn * Cn' * Sn' |

Now: since the calibration is all relative, set $C1=1$. Also, it is known that $S2=S1e^{j\phi}, \ldots$ which provides:

$$Rxx =$$

| | | | | |
|---|---|---|---|---|
| $S1 * S1'$ | $S1 * S2 * C2'e^{-j\phi}$ | | | |
| $\ldots$ | $C2 * C2' * S2 * S2'$ | | | |
| | | $C3 * C3' * S3 * S3'$ | | |
| | | | $\ldots Cn * Cn' * Sn * Sn'$ | |

It is assumed that the long term average amplitudes of the S's are the same if they are averaged long enough to remove the effects of fading. As a result, the amplitudes of the Cs can be solved simply by looking at the diagonal terms of the covariance matrices.

Assuming that the arriving signal is a "linear phase ramp" and the antenna structure is a uniform linear array, the phases of the calibration vector can be solved by looking at the first row of Rzz and solving a simple set of linear equations for phase C2, phase C3 . . . , phase Cn and $\phi$.

Detailed Methodology for Receive Method 2:
1. Select a "qualified" terminal(s) by identifying terminals with receive signals that have only one significant rake tap.
2. Collect an "Rzz" from the received signal(s) from this terminal, averaging over a long enough period to remove "fast fading" effects (i.e. 100 msecs).
3. Take the square root of the diagonal elements of Rzz as the magnitudes of the receive calibration values.
4. Calculate $\theta$, and the phases of the calibration values by using the first row of the Rzz and solving a set of simultaneous linear equations as above.
5. Select additional "qualified" terminals and form Rzzs.
6. Update the calibration amplitudes by averaging over the multiple terminals.
7. Update the calibration phases either by averaging over multiple remote user terminals or by solving larger sets of simultaneous equations, combining multiple Rzz first rows, solving for multiple $\theta$s, and assuming the calibration values are unchanged. As more remote user terminals are included, this will become an overdetermined system. The "best" calibration phases can then be determined using "least squares" techniques that are well known in the art.

Receive Method 3: Invariance Covariance Method

Receive method 3 is a variation on receive method 2. Method 3 can cope with signals with large angular spread (more than one distinct direction of arrival) and does not require the estimation of the direction of arrival (the $\theta$s). The disadvantage is that it requires some translational geometrical invariance in the antenna array. This is the case in ULA's (Uniform Linear Array), rectangular arrays, and even well designed circular arrays.

Background:

As seen in method 2, the covariance matrix can be expressed as shown or a ULA when one direction of arrival is present.

$$Rzz(\phi) =$$

| | | | |
|---|---|---|---|
| $S1 * S1'$ | $S1 * S2' * C2' e^{-j\phi}$ | $S1 * S3' * C3' e^{-j2\phi}$ | $S1 * S4' * C4' ^{-ej3\phi}$ |
| $\ldots$ | $C2 * C2' * S2 * S2'$ | $S2*S3'*C2*C3'^{-j\phi}$ | $S2*S4'*C2*C4' e^{-j2\phi}$ |
| | | $C3 * C3' * S3 * S3'$ | $S3*S4'*C3*C4' e^{-j\phi}$ |
| | | | $\ldots Cn * Cn' * Sn * Sn'$ |

When multiple directions of arrival are present, the long term covariance matrix is the sum of the partial covariance matrix for each direction of arrival:

$Rzz=Rzz(\phi 1)+Rzz(\phi 2)+ \ldots$

Note that cross terms tend to null out as the fast fading is normally uncorrelated between different directions of arrival since the Doppler frequencies are different.

Now again under the assumption that the long term average amplitudes of the S's are the same, the covariance matrix is a Toeplitz matrix once it is calibrated (i.e. once all C's are set equal to 1.

$$Rzz =$$

| | | | |
|---|---|---|---|
| K1 | $C2' * K2$ | $C3' * K3$ | $C4' * K4$ |
| $\ldots$ | $C2 * C2' * K1$ | $C2 * C3' * K2$ | $C2 * C4' * K3$ |
| | | $C3 * C3' * K1$ | $C3 * C4' * K2$ |
| | | | $\ldots Cn * Cn' * K1$ |

This leads directly to a system of equations which can be solved for Cn and Kn, possibly by using several Rzz from different remote user terminals. Only the terms where the Kn is repeated at least twice in the upper triangular Rzz need to be kept in the system. In the example, above these terms are K1, K2 and K3, but not K4.

In case the array is not a ULA, the Rzz is not a Toeplitz matrix but can still be written in a form in which some of the Kn are repeated because of the invariance property. For instance, in the case of an array formed by 2 sub-arrays of a ULA, the matrix can be written as follows, where the change is only to row 2 and column 3.

$$Rzz =$$

| | | | |
|---|---|---|---|
| K1 | $C2' * K2$ | $C3' * K3$ | $C4' * K4$ |
| $\ldots$ | $C2 * C2' * K1$ | $C2 * C3' * K5$ | $C2 * C4' * K3$ |

$$Rzz = \begin{pmatrix} C3 * C3' * K1 & C3 * C4' * K2 \\ & \ldots Cn * Cn' * K1 \end{pmatrix}$$

Detailed Methodology for Receive method 3
1. Select a "qualified" terminal(s) by identifying terminal(s) which experience a good SINR and possibly only one significant rake tap
2. Collect an Rzz from the received signal(s) from that terminal, averaging over a long period to remove "fast fading" effects. For spread spectrum systems, this Rzz should be computed on the de-spread signal in order to decrease the noise in the Rzz due to thermal noise and other remote user terminals.
3. Take the square root of the diagonal elements of Rzz as the magnitudes of the receive calibration values.
4. Calculate the Kn and the phases of the calibration values by solving a set of simultaneous equations as described above.
5. Select additional "qualified" terminals and form Rzz's. Possibly use power control to increase the transmission power of these "qualified" terminals above the minimal SINR required for reception. Thus a "non qualified" terminal can become "qualified" with the help of power control.
6. Update the calibration amplitudes by averaging over the multiple terminals.
7. Update the calibration phases either by averaging over multiple remote user terminals or by solving larger sets of simultaneous equations, combining multiple Rzz, solving for multiple sets of Kn, and assuming the calibration values are unchanged. As more remote user terminals are included this will become an overdetermined system. The "best" calibration values can then be determined using "least squares" techniques that are well known in the art.

New data can always be acquired for other remote user terminals that have different characteristic spatial signatures. The number of equations can then be multiplied by the number of data sets considered, while adding only M new unknowns to the system if we assume that the calibration vector is constant. By doing this, any under-determined system (e.g. one with too few antennas) can be solved. This is also useful to increase the precision of the estimate because the noise in the system can be averaged out.

This general system with multiple data sets can be written using the matrices above which leads naturally to a least square solving procedure, which is the transcription of a maximum likelihood approach that assumes Gaussian noise. In order to track the calibration vector which changes slowly over time, the last K data set in the least squares derivation can simply be used. Alternatively, a Bayes adaptive procedure can be derived.

In the receive calibration, the undesired component should be averaged out so that $R_o$ becomes small. As the Doppler frequency between different rays may be very small for rays with very close angles of departure from the remote user terminal, the undesired component can be averaged over a long time period. Accuracy can be improved by selecting as valid data only signals from remote user terminals with high speed. The issue in that case becomes the large-scale fading. New rays appear and old rays disappear due to shadowing. When the system is overdetermined, for example as in the case of an eight antenna array, the methods can also cope with imperfections in antenna positioning.

The methods can average many remote user terminal signals in a combined long term covariance matrix. As the number of samples increase, the noise part of the matrix will show a power decrease while the calibration signals will be reinforced in the diagonal of the matrix. The elements that are not on the diagonal will, however, null out slowly with the increasing number of signals so there will not be as much gain in the phase estimation unless the steering vector does not span the entire angle range. This is the case in a sectorized cell with antennas spaced very closely.

Transmit Calibration

Transmit calibration finds the relative transmitter amplitudes and phases from the DACs (digital to analog converter) through the radio, power amplifier, and feeder cables. For transmit calibration, feedback from the user terminal is exploited. In the specific example of the WCDMA radio system, (UMTS 3G), the feedback provided by the transmit diversity scheme specified by the standard can be used to support transmit calibration.

Transmit Diversity

The WCDMA standard supports several schemes for Transmit diversity. One of the scheme is open loop and does not require feedback from the remote user terminal. A second scheme is a closed loop scheme where the remote user terminal provides some feedback to the base station. The WCDMA transmit diversity schemes are provided in the standard as a way to decrease the effect of fading in downlink signals by placing two antennas widely apart (in order to decrease their spatial correlation). For that purpose, having more than two antennas does not provide any significant benefit. As a result, the closed loop transmit diversity scheme is designed for a simple two antenna system. There are two variations on the closed loop scheme, mode1 and mode2, which differ primarily in the precision of the measurement performed and fed back by the remote user terminal. This directly affects the transmit diversity adaptation rate.

The closed loop transmit diversity mode2 provided in the WCDMA standard can be used to perform transmit calibration. In mode2, the WCDMA base station sends the same data but with different channelization (scrambling codes) out of two different antennas (or groups of antennas). It does this by sending the remote user terminal signal over two antennas with different complex scaling. These two signals are designed to add constructively at the remote user terminal. It also transmits one control signal (named common pilot channel or CPICH) on each antenna but with a orthogonal channelization codes (thus sending effectively two different signals).

The remote user terminal uses these two pilot signals to separately estimate the channel seen from each antenna. It then computes a set of weights for phase and amplitude which, if applied to one signal, would maximize the received quality of the combination of signals. These weights are quantized in some way depending on the closed loop mode, and the quantized result is fed back to the base station. The phase feedback from the remote user terminal is quantized to an accuracy of $\pi/4$ and the amplitude is quantized TBDE. It is also possible to use transmit diversity mode1, the difference is that only the phase feedback is provided by the remote user terminal (with an accuracy of $\pi/2$).

The purpose of the transmit diversity feedback signal is to allow the base station to continually adjust the complex scaling of its two transmit signals so that they arrive phase coherently, and with equal amplitude, at the user terminal. This process is then repeated every slot.

The standard recommends that the remote user terminal solve for the weight vector w by maximizing:

$$P=w^H H^H H w$$

where $H=[h_1, h_2]$ and $w=[w_1, w_2]^T$ and where $h_1$ and $h_2$ are the estimated impulse response of the channel seen on each antenna.

However, this method for solving the weight vector w is only a recommendation. The standard allows for a remote user terminal to do any other kind of suboptimal solution. The method mentioned above is recommended only for cases in which there is not a soft handover. For the soft handover case, a multiple base station optimization is recommended.

The quantization of the weight vector (actually the ratio $w_1/w_2$) depends on the closed loop mode of operation and is within the one bit of information available for this feedback every slot period. In mode 1, the phase is quantized differently depending on the slot parity and successively on the upper/lower ($\pm\pi/2$) and left/right ($0,\pi$) quadrant. The amplitude is not quantized. As such, the base station can track the weight on one of the four quadrants every 2 slots. In mode 2, the phase is quantized over 4 bits, i.e. the feedback lasts 4 consecutive slots. The phase is quantized on 3 bits, i.e. among the set ($k\pi/4$) and the amplitude on 1bit i.e. the set $\{0.2, 0.8\}, \{0.8, 0.2\}$.

As a result, the calibration of the base station will be more accurate if it does not rely on the optimization method recommended by the standard because any remote user terminal may actually use another calibration algorithm. However, if the estimated impulse responses are single tapped, then H is a simple vector and any kind of optimization algorithm will most likely give the same answer to the problem, i.e. the vector w should be colinear to the vector H. The vector w is basically the exact transcription of the channel between the two antennas. This property can be exploited using calls which have only one strong tap. This can be easily done by looking at long term uplink parameters.

Now using these channel measurements done by the remote user terminal, the long term covariance matrix for the downlink channel can be formed. The diagonal part of this long term covariance matrix can be estimated using power control feedback.

There are at least two ways of inferring the value of $C_d$, the distortion vector of the transmit chain. One way is to use the uplink long term covariance matrix to estimate the model order, the angles of incidence $\theta_1$ and the fading characteristics of the signals. In order to estimate the gains from the uplink covariance matrix the uplink gain factors must also be removed when forming the long term covariance matrix. We can then form the calibrated part of the long term covariance matrix for the downlink channel. and inject it into an equation which characterizes the temporal invariances in the antenna arrays. By performing this process for many remote user terminals, it is then possible to derive the value of $C_d$ by a least squares approach which averages out the noise term.

Another way relies on a Toeplitz matrix. As in the Rx calibration inference case, the long term covariance matrix (not considering the noise) should be a Toeplitz matrix. We can then use this property to avoid estimating and injecting the unknown parameters estimated from the receive statistics. This has the added benefit of relaxing some requirements, as now one can assume that the uplink and downlink rays are different. The one tapped channel should, however, still be identified. Knowledge of the uplink calibration vectors is, however, not needed.

As described above, the transmit feedback can estimate the channel difference between two antennas only at one instant of time. To accumulate the full long term covariance matrix will thus take a very long duration. Since only one element of the matrix can be estimated at a time, the acquisition duration would be related to the uplink covarisition accumulation. By alternating the element acquisition, this duration can be reduced but it is still very long. During this time, the channel characteristics may change due to large scale fading, shadowing, etc.

To reduce the effects of fading for one remote user terminal signal, just a subset of the covariance matrix can be acquired. It is sufficient to accumulate two elements of the matrix which have the same geometrical invariance. This gives one equation of the global equation system, which can be solved similarly to the uplink case. One main difference is that the noise distribution is in general not Gaussian. As an example imagine that each signal considered has only one main direction of arrival. It becomes impossible to derive the magnitude of the calibration vector with the global system of equations. In that specific case, each noise term has a very peculiar distribution which is localized on the perimeter of a curved square. It is thus helpful to force the noise to have a smoother distribution which is also not dependent only on the calibration values. This can be attained by weighting the two pilot signals with different complex scalars over time and removing this weighting from the fed back channel estimates. Now, when averaging the channel estimates, the inherent noise will have a much smoother distribution which converges on the limit to an approximate Gaussian distribution. As the knowledge of the calibration vector gets more accurate, the weights applied on the pilot signals can be easily optimized to decrease the variance of the inherent quantization noise.

Transmit Method 1: Long Term Statistics Method

This is the counterpart of receive method 1. Here calibration signals are transmitted in pairs over sets of antennas and the transmit diversity feedback is used to find the transmit calibration. Some repetition, with different intentional phase and amplitude offsets can be used to overcome the quantization in the feedback and provide better accuracy. This is expected to work especially well for the calibration amplitude derivation. It can also be used for the calibration phase derivation under the assumption that the remote user terminals are uniformly distributed.

The method can be performed as follows:
1. Identify "qualified" calibration sources by finding those sources with only one significant rake tap in their uplink. This will select those terminals with very low multipath. Also, "qualify" remote user terminals with enough signal headroom to perform calibration by identifying remote user terminals whose current uplink power and downlink power is at less than half of maximum (as seen by power control).
2. Set the transmit phase on antenna 1 to 0 degrees.
3. Using transmit diversity closed loop mode 2, transmit pairwise out of antenna 1 and antenna 2. The phase adjustment is applied also to the CPICH signals
4. Store the feedback phase and amplitude information from the remote user terminal.
5. Possibly adjust the phase of the transmit signal on antenna 2 with an offset smaller than the quantization of the feedback (for instance $\pi/8$) and repeat the operation.

6. Repeat pairwise over all the other antennas (paired with antenna 1).
7. Repeat the whole process over time for that remote user terminal
8. Repeat using several other remote user terminals.
9. The calibration amplitude is the average of all the calibration amplitude feedback accumulated. The calibration phase is calculated similarly.

Transmit Method 2: Covariance Method

In method 2, calibration signals are transmitted in pairs over sets of antennas and the transmit diversity feedback is used along with the known receive calibration in a straightforward manner to find the transmit calibration. Some repetition, with different intentional phase and amplitude offsets can be used to overcome the quantization in the feedback and provide better accuracy. This method can be seen as the counterpart of receive method 2.

The method can be performed as follows:
1. Identify "qualified" calibration sources by finding those sources with only one significant rake tap on the uplink (second tap more than 10 dB less receive power). Also "qualify" remote user terminals with a low angular spread (one main direction of arrival) from the uplink spatial signature. Also, "qualify" remote user terminals with enough signal headroom to perform calibration by identifying remote user terminals whose current uplink power and downlink power is at less than half of maximum (as seen by power control).
2. Set the transmit phase on antenna 1 to 0 degrees.
3. Using transmit diversity closed loop mode 2, transmit pairwise out of antenna 1 and antenna 2. The phase adjustment is applied also to the CPICH signals.
4. Adjust the phase of the transmit signal on antenna 2 to within $\pi/4$ based on the feedback from the remote user terminal. This required transmit phase on antenna 2 compared to antenna 1 is the coarse transmit calibration for antenna 2.
5. Now adjust the transmit phase on antenna 2 by small increments until the feedback from the remote user terminal "toggles" to the next $\pi/4$ increment. Call this the fine calibration offset for antenna 2.
6. The calibration phase for antenna 2 is then the coarse phase+the fine offset$-\pi/8-$(calibrated receive spatial signature phase difference between antennas 1 and 2).
7. Repeat pairwise over all the other antennas (paired with antenna 1).
8. Repeat the whole process over time for that remote user terminal, averaging the results
9. Repeat for several other remote user terminals, averaging the results.

Transmit Method 2: Invariance Covariance Approach

This is the counterpart of the receive method 3. The idea is to estimate elements of the downlink long term Rzz using transmit diversity feedback. These elements of Rzz are then used to form an overdetermined system of equations which can be solved using least squares techniques.

The method can be performed as follows:
1. Identify "qualified" calibration sources by finding those sources with only one significant rake tap on the uplink (second tap more than 10 dB less receive power). Also, "qualify" remote user terminals with enough signal headroom to perform calibration by identifying remote user terminals whose current uplink power and downlink power is at less than half of maximum (as seen by power control).
2. Set the transmit phase on antenna 1 to 0 degrees.
3. Using transmit diversity closed loop mode 2, transmit pairwise out of antenna 1 and antenna 2. The phase adjustment is applied also to the CPICH signals
4. Store the feedback phase and amplitude for the remote user terminal
5. Possibly adjust the phase of the transmit signal on antenna 2 to half of the feedback accuracy and adjust the stored phase with the new feedback by simple averaging. This step can be repeated until the desired precision is acquired.
6. Repeat pairwise over 2 other antennas which have the same geometrical invariance as antennas 1 and 2 (for instance antennas 3 and 4 in a ULA).
7. Repeat the process over time, and average the results for each of the 2 pairs of antennas in order to get long term estimates. This produces 2 equations of the system of equations.
8. Possibly repeat the whole process for the qualified remote user terminal using another set of antenna pairs which share the same invariance. This gives another 2 equations.
9. Repeat for several other remote user terminals, and build a large overdetermined system of equations.
10. Solve the overdetermined system of equations by some least squares method well known in the art. This gives the transmit calibration values.

Improvements and General Considerations

A number of other parameters (in addition to or instead of the number of significant rake taps) can be used to qualify remote user terminals for use in calibration. For example, measurements of Doppler shift can be used to identify remote user terminals with low mobility. This ensures that S is static during the accumulation of the Rzz. Power control values can also be used to identify remote user terminals that have good propagation paths to the base station (low power=good path).

While the tx-diversity scheme in WCDMA provides feedback information that can be fairly directly used to calculate calibration values, other forms of mobile feedback can also be exploited less directly to perform calibration. For example, power control feedback tells whether the base station is delivering more or less power to the remote user terminal and so can be used in a "searching" fashion to perform transmit calibration.

The above methods are easily extended to non-uniform arrays especially if the expected arrival phases as a function of angle can be easily predicted from a small number of parameters. As another alternative, less than all of the transmit or receive chains can be calibrated at one time. If all transmit chains are not involved in each calibration measurement, then repeated calibration measurements with different sets of transmit chains can be performed such that all relative phases, amplitudes and frequency offsets can be measured among all transmit antennas. Accuracy is improved if there is a common transmit chain in each of the measurements. This allows the measured phases, amplitudes and frequency offsets to be related to each other with reference to the common chain. Typically one of the transmit chains is designated as a reference transmit chain and participates in every measurement.

Base Station Structure

The present invention relates to wireless communication systems and may be a fixed-access or mobile-access wireless network. It may use spatial division multiple access (SDMA) technology in combination with wide band multiple access systems, such as code division multiple access (CDMA), and other spread spectrum type systems. The FIGURE shows an example of a base station of a wireless communications system or network suitable for implementing the present invention. The system or network includes a number of subscriber stations, also referred to as remote terminals or user terminals, (not shown). The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

The outputs of the antennas are connected to a duplexer switch 107, which in this CDMA system is a frequency switch. When receiving, the antenna outputs are connected via switch 107 to RF (radio frequency) receive modules 205, and are sampled and converted to digital in an ADC (analog to digital converter) 207. The digitized signals are mixed down and channelized in a down converter 209. This can be done using FIR (finite impulse response) filtering techniques. The invention can be adapted to suit a wide variety of RF and IF (intermediate frequency) carrier frequencies and bands.

There are, in the present example, four antenna channel outputs, one from each antenna receive module 205. The particular number of channels can be varied to suit network needs. For each of the four receive antenna channels, the four down-converted outputs from the four antennas are fed to a digital signal processor (DSP) device 217 for further processing, including calibration. According to one aspect of this invention, four Motorola DSP56311 DSPs can be used as channel processors, one per receive channel. The timeslot processors 217 monitor the received signal power and estimate the phase and time alignment. They also determine smart antenna weights for each antenna element. These are used in the spatial division multiple access scheme to determine a signal from a particular remote user and to demodulate the determined signal.

The output of the channel processors 217 is demodulated burst data. This data is sent to the host DSP 231 whose main function is to control all elements of the system and interface with the higher level processing. The higher level processing provides the signals required for communications in all the different control and service communication channels defined in the system's communication protocols. The host DSP 231 can be a Motorola DSP56303. In addition, channel processors send the determined receive weights for each user terminal to the host DSP 231. The host DSP 231 maintains state and timing information, receives uplink burst data from the channel processors 217, and programs the channel processors 217. In addition it decrypts, descrambles, checks error detecting code, and deconstructs bursts of the uplink signals, then formats the uplink signals to be sent for higher level processing in other parts of the base station. With respect to the other parts of the base station, it formats service data and traffic data for further higher processing in the base station, receives downlink messages and traffic data from the other parts of the base station, processes the downlink bursts and formats and sends the downlink bursts to the transmit chain, discussed below.

Transmit data from the host DSP 231 is used to produce analog transmit outputs which are sent to the RF transmitter (TX) modules 245. Specifically, the received data bits are up-converted into a complex modulated signal at an IF frequency in an upconverter 241 and converted via a DAC (digital to analog converter) 243 to analog transmit waveforms. The analog waveforms are sent to the transmit modules 245. The transmit modules 245 up-convert the signals to the transmission frequency and amplify the signals. The amplified transmission signal outputs are sent to antennas 103 via the duplexer/time switch 107.

The present invention provides many advantages over the prior art. Calibrations can be performed without using a remote transponder. Both transmit and receive calibration can be determined by taking advantage of normal traffic with communicating remote user terminals. Accordingly, calibration in accordance with the present invention is inherently unobtrusive and inexpensive.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIG. 1, or may be embodied in machine-executable instructions, which may be used to cause a general-purpose or special-purpose processor or logic circuits, such as a DSP programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media or machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless spread spectrum data system for mobile remote terminals, it can be applied to a wide variety of different wireless systems in which data is exchanged. Such systems include voice, video, music, broadcast and other types of data systems without external connections. The present invention can be applied to fixed user terminals as well as to low and high mobility terminals. Many of the methods are described herein in a basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method for calibrating a radio receiver having a plurality of antennas configured into an array, the method comprising:

receiving a plurality of signals from a plurality of remote transmitters at the antenna array;

sampling the signals received at at least two antennas of the array;

computing a relative phase and amplitude of the sampled signals for each sampled signal for each antenna;

averaging the computed phase and amplitude for each antenna for each subsequent sampled signal; and computing calibration coefficients based on the relative phase and amplitude for the plurality of sampled signals from the plurality of remote transmitters for each antenna by using the average phase and amplitude.

2. The method of claim 1, wherein computing a relative phase and amplitude comprises computing a relative phase and amplitude for each sampled signal, the method further comprising averaging the computed phase and amplitude over all sampled signals and wherein computing calibration coefficients comprises computing calibration coefficients based on the averages.

3. The method of claim 1, wherein computing calibration coefficients comprises computing a first set of calibration coefficients based on a computed relative phase and amplitude for at least one sampled signal and then adjusting the calibration coefficients for each subsequent computed phase and amplitude.

4. The method of claim 1, further comprising testing the convergence of the computed average phase and amplitude after each average computation; and wherein computing calibration coefficients comprises using the average phase and amplitude if the computed average phase and amplitude has sufficiently converged.

5. The method of claim 1, further comprising averaging a signal for an antenna for a duration longer than any fast fading effect on the respective signal before computing a relative phase and amplitude for the respective signal.

6. The method of claim 1, further comprising testing the sampled signals for suitability and discarding the sampled signals if the suitability is not sufficiently high.

7. The method of claim 1, wherein testing for suitability comprises measuring noise in the signal.

8. The method of claim 1, wherein receiving a signal comprises receiving a signal at a rake receiver and wherein testing for suitability comprises comparing the levels at different taps of the rake receiver.

9. The method of claim 1, wherein testing for suitability comprises selecting signals having a channel estimate indicating multipath signals below a certain level.

10. The method of claim 1, wherein testing for suitability comprises selecting signals having multipath signals below a selected level.

11. The method of claim 1, wherein computing a phase and amplitude comprise building a covariance matrix of the sampled signals and using a column or row of that covariance matrix.

12. The method of claim 1, wherein computing a phase and amplitude comprise building a covariance matrix of the sample signals, performing an eigenvalue decomposition, and using an eigenvector associated with the primary eigenvalue as the phase and amplitude.

13. The method of claim 1, wherein computing a phase comprises solving a set of simultaneous equations based on a row of the covariance matrix.

14. The method of claim 1, wherein computing an amplitude comprises taking a square root of a diagonal of the covariance matrix.

15. The method of claim 1, further comprising compensating the sampled signals for differences in angle of arrival.

16. The method of claim 1, wherein compensating the sampled signals comprises subtracting a portion of a phase difference between the same signal received at different antennas by a phase difference attributable to the distance between the different antennas.

17. The method of claim 1, wherein the received signals are traffic signals in a wireless data communications system.

18. The method of claim 1, wherein the remote transmitters comprise traffic subscribers in a wireless data communications system.

19. The method of claim 1, wherein computing a phase and amplitude comprise building a covariance matrix of the sample signals, performing an eigenvalue decomposition, and using an eigenvector associated with the primary eigenvalue as the phase and amplitude.

20. A machine-readable medium containing instructions, which when operated on by the machine, cause the machine to perform operations comprising:

receiving a plurality of signals from a plurality of remote transmitters at each of a plurality of antennas configured into an array, sampling the signals received at at least two antennas of the array;

computing a relative phase and amplitude of the sampled signals for each sampled signal for each antenna;

averaging the computed phase and amplitude for each antenna for each subsequent sampled signal; and computing calibration coefficients based on the relative phase and amplitude for the plurality of sampled signals from the plurality of remote transmitters for each antenna by using the average phase and amplitude.

21. The medium of claim 20, wherein computing calibration coefficients comprises computing a first set of calibration coefficients based on a computed relative phase and amplitude for at least one sampled signal and then adjusting the calibration coefficients for each subsequent computed phase and amplitude.

* * * * *